Patented Nov. 2, 1948

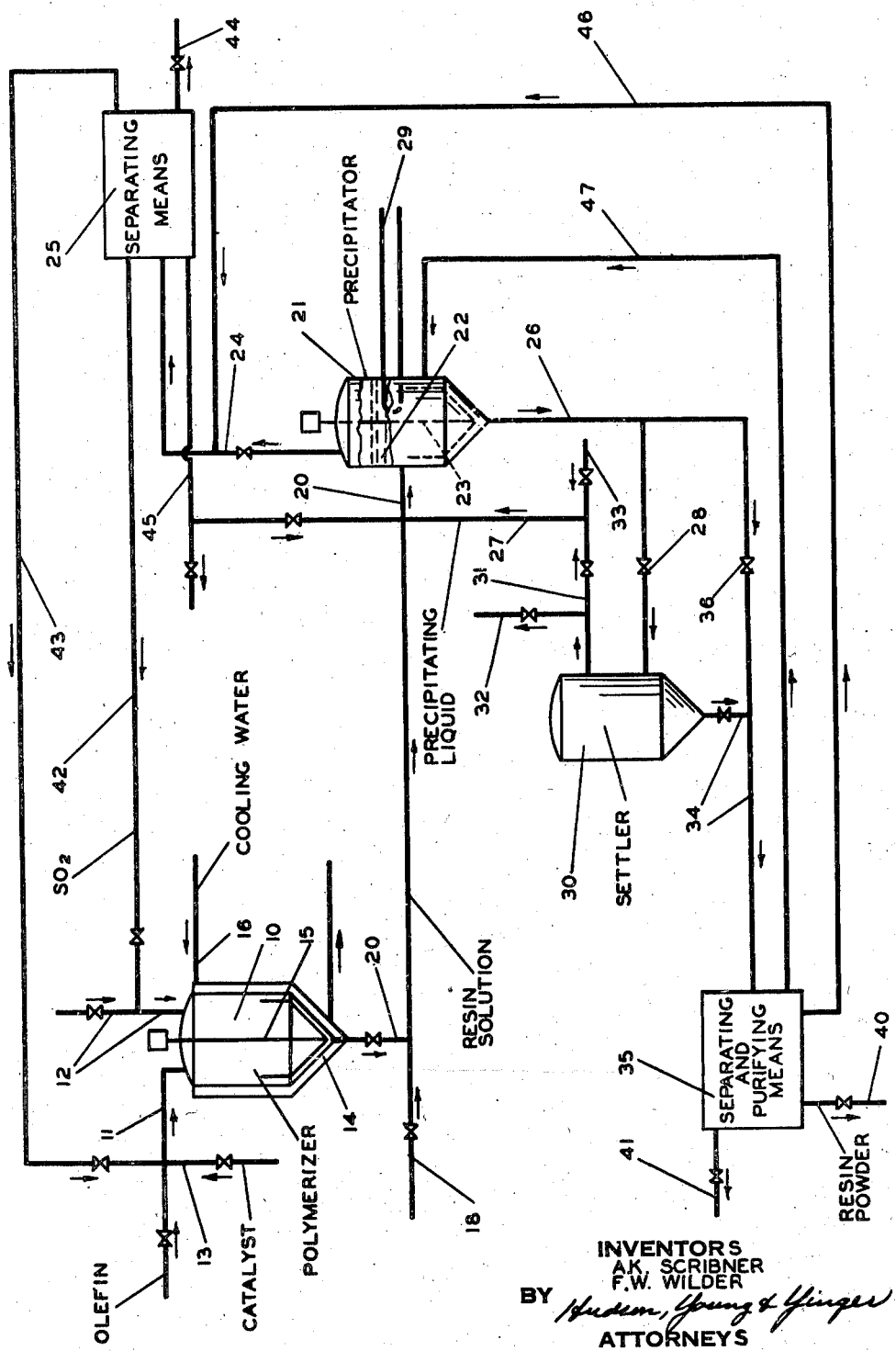

2,453,039

UNITED STATES PATENT OFFICE 2,453,039

MANUFACTURE OF RESINS FROM SULFUR DIOXIDE AND UNSATURATED ORGANIC COMPOUNDS

Allison K. Scribner and Frank W. Wilder, Portsmouth, Va., assignors, by mesne assignments, to Phillips Petroleum Company, a corporation of Delaware Application August 23, 1943, Serial No. 499,713

5 Claims. (Cl. 260—94.5)

This invention relates to the production of synthetic resinous materials formed by reaction between sulfur dioxide and one or more unsaturated organic compounds.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins, cyclo-olefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, O-allylanisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and when forming the resin from a mixture of organic unsaturated compounds, it appears desirable to conduct the reaction at a temperature below the ceiling temperature of the material having the lowest ceiling temperature.

The resin-forming reaction is somewhat exothermic and generally some provision must be made for removing the heat of reaction. All of these features are more fully described in the literature.

The resins heretofore produced have generally been formed in the presence of only a moderate excess of sulfur dioxide and have been recovered as solid materials possessing a horn-like appearance or having a porous expanded form. These materials are tough and difficult to handle. In order to secure successful commercial products it has been necessary to grind these mechanically in order to form a finely divided material thus facilitating removal of occluded impurities. Even when ground to a fine powder, it has often been difficult to remove completely all of the occluded impurities, such as uncombined reactants and other materials either present in the reactants as charged to the process or introduced in processing and handling the resin. In some instances it appears that the grinding procedure results in the introduction of minute quantities of metallic impurities which affect the clarity and general appearance of the molded products. Further, the grinding procedure developes undesirable heat which tends to soften the resin and cause the ground particles of resin to fuse, thus increasing the difficulty of the removal of impurities and in some instances resulting in an unsatisfactory molding powder because of particle size. Also, even if the grinding operation results in a satisfactory, fine powder, the removal of occluded impurities is difficult and expensive.

It has now been found that when the resin-forming reaction is carried out in the presence of a large enough excess of sulfur dioxide to produce a resulting solution of the resin in the unreacted sulfur dioxide which is mobile and when the resin is formed by the reaction of sulfur dioxide and an unsaturated organic compound or compounds which react to form a heteropolymer soluble in sulfur dioxide, the resulting solution can be readily handled in commercial equipment as a liquid and the resin can be readily obtained in a pure state and in the form of a powder suitable for molding. Unsaturated organic compounds which react with sulfur dioxide to form a reaction product soluble in sulfur dioxide are generally those which contain four or more carbon atoms to the molecule, and mixtures of such materials with unsaturated materials containing less than four carbon atoms per molecule, but in such proportions that the resulting reaction product is soluble in sulfur dioxide. It has also been found that when such a solution of a resin is rapidly and intimately mixed with a volume of an inert liquid in which the resin is substantially insoluble, the resin can be obtained as a finely divided solid material which can be readily handled and purified and is quite suitable for subsequent molding. Suitable inert liquids include hydroxy compounds such as water and alcohols, especially ethyl and methyl alcohol; ethers such as diethyl ether; hydrocarbons and hydrocarbon fractions such as benzene, hexane, petroleum naphthas of narrow boiling range and the like; chlorinated hydrocarbons such as methyl chloride, carbon tetrachloride, chloroform, trichloro ethylene, methylene chloride, etc. When the solution of the resin in sulfur dioxide is intimately mixed with such an inert liquid, the resin separates as a finely divided material, which can be readily passed to suitable filtering and drying equipment as a slurry, which can be readily washed free of impurities, and when dried is in the final form of a finely divided granular or powdery material. When a resin is so precipitated in a relatively non-volatile liquid, subsequent washing and purifying steps may be performed with a relatively volatile liquid so that the final product may be more readily dried. Thus, when the resin is precipitated by mixing the sulfur dioxide solution with water, the final washing may be conducted with methyl or ethyl alcohol and when a somewhat non-volatile petroleum naphtha or other non-volatile hydrocarbon material is used the final washing may be done with a more volatile material such as a pentane fraction. While precipitation of the resin from the sulfur dioxide-resin solution may be effected by dispersing the resin solution into a volume of the inert liquid in a closed system under pressure, in which case the volume of inert liquid must be sufficiently large that the concentration of dissolved sulfur dioxide is not sufficient to redissolve the resin and not sufficient to form two liquid phases, a presently preferred manner of operation is to disperse the solution into a body of the inert liquid at a low pressure so that a major portion of the sulfur dioxide is vaporized and immediately removed from the resulting slurry of inert liquid and precipitated resin. This vaporization of sulfur dioxide naturally has a cooling effect and generally heat should be supplied so that too low a temperature will not be produced. On the other hand, the heat should not be supplied at such a rate that an excessive temperature results, since at higher temperatures the resin often tends to fuse or to be precipitated in a somewhat granular or pelletted form which has a rather smooth hard surface, the granules or pellets containing entrapped sulfur dioxide and/or unreacted hydrocarbons which are quite difficult to remove subsequently. When dispersing the sulfur dioxide solution into a large body of water with removal of sulfur dioxide vapors, a preferred temperature range for the body of water is about 60° F. to about 140° F., and more preferably within the range of 90 to 120° F., although, in many instances, a satisfactory precipitate may be formed at temperatures as high as 180° F. and as low as 35° F. Lower temperatures may result in an excessively high content of sulfur dioxide in the slurry. In either mode of precipitation the intimate mixing is preferably accompanied by vigorous agitation.

An object of this invention is to react sulfur dioxide and an unsaturated organic compound to form a heteropolymeric resin.

A further object of this invention is to produce a heteropolymeric resin of sulfur dioxide and an unsaturated organic compound in a finely divided, dry and pure form.

A still further object of this invention is to effect a continuous production, from sulfur dioxide and a low-boiling olefinic material, of a resin in a finely divided form.

Further objects and advantages of this invention will become apparent, to one skilled in the art, from the accompanying disclosure and discussion.

One embodiment of this invention will now be described in connection with the accompanying drawing which forms a part of this application, and which is in the form of a diagrammatic flow sheet with part of the apparatus in elevation and part in section. A suitable unsaturated compound such as a low-boiling olefin or a mixture of low-boiling olefins is charged to reactor 10 through line 11. In batch operations the reactor is preferably first charged with a quantity of liquid sulfur dioxide through line 12. The amount of sulfur dioxide present in the reactor 10 is sufficiently in excess of that entering into the reaction to form a mobile solution with the resin product. In some instances, it may be desirable to conduct the reaction in the presence of a smaller excess of sulfur dioxide and then to add additional sulfur dioxide or suitable solvent toward the end of, or after completion of, the reaction to provide a mobile solution which can be readily removed from the reactor. In the case of resins formed by the reaction of sulfur dioxide with propylene, butene-2 and butene-1 in the weight ratio of olefins of fifty per cent, thirty-three per cent and seventeen per cent, respectively, it has been found that an excess of sulfur dioxide to olefins of 15 or 20 times, by weight, the amount of olefins produces a free-flowing liquid having a viscosity similar to that of SAE 30 lubricating oil. The amount of excess to be used obviously will be dependent upon the solubility in sulfur dioxide of the particular resin formed and can be readily ascertained by trial. To those skilled in the art it will be apparent that sufficient excess should be used to result in a solution of the particular resin formed in sulfur dioxide which is sufficiently mobile for ready removal from the reactor as a liquid. A suitable catalyst is charged through line 13 either at the start of the reaction or continuously during the course of the reaction. Temperature control may be effected by means of a surrounding water jacket 14 and the contents of the reactor are preferably kept in motion during the reaction by means of an agitator 15. Cooling water may be passed through the water jacket as desired through line 16.

After the resin-forming reaction has proceeded to completion, or to a desired extent short of completion which more often gives optimum commercial operation, a solution of the resin and liquid sulfur dioxide is passed from reactor 10 through line 20 to precipitator 21 which contains a suitable volume of inert liquid 22 such as water or one of the other materials hereinbefore discussed. Precipitator 21 is provided with suitable agitation means 23 and temperature control means 29, and sulfur dioxide and any other unreacted volatile constituents are continuously removed through line 24 to separating means 25 as the resin solution is passed into the precipitator. When operating the process as a batch process the introduction of the resin solution and agitation of the liquid 22 is continued to a point at which the resulting slurry is still pumpable. However, it will generally be more feasible to operate the process continuously with continuous removal of the slurry through line 26 and continuous addition of the inert liquid through line 27. The slurry may be passed through valve 28 to a settler 30 or to other means for separating the resin from the bulk of the inert liquid such as a preliminary filter. The inert liquid may be returned to the precipitator through lines 31 and 27 and preferably some of it is discharged, at least in part, through line 32 for purification. When unreacted low boiling olefins are contained in the resin solution entering the precipitator through line 20 these will generally be passed to separating means 25 as a vapor through line 24 along with the vaporous sulfur dioxide. When higher boiling unsaturated organic compounds have been used in producing the resin and have not been entirely reacted they will be present in the liquid removed in settler 30 and a large part or all of the liquid removed from the resin will have to be discharged through line 32 for separation of the materials contained therein. Any desired quantity of inert liquid for use in precipitator 21 can be supplied through line 33 to line 27.

From the bottom of settler 30 the solid resinous material in a somewhat concentrated slurry form is passed through line 34 to separating and purifying means 35. If desired, the settler 30 may be by-passed by closing valve 28 and passing the resin through valve 36 directly to separating means 35. In separating means 35 the resin will be subjected, as necessary, to additional washing and drying steps until a final product is obtained in a dry finely divided or powdered form. This material is recovered as a product of the process from separating means 35 through line 40 and undesired impurities can be discharged through line 41, or may be sent in whole or in part to the separating means 25 through line 46, or returned to the precipitator through line 47.

The vapors pass through line 24 to separating means 25, are subjected to suitable separation and purification treatment such as fractional distillation, selective solvent extraction and the like to separate sulfur dioxide, unreacted unsaturated material, vapors of the inert liquid 22, etc. Sulfur dioxide may be recycled to the reactor 10 through line 42, unreacted unsaturated material may be recycled through line 43, impurities such as a low boiling paraffin hydrocarbon can be discharged through line 44, and recovered inert liquid can be passed through line 45, and if desired, returned, at least in part, to the system.

Although the process of the invention has been described and will generally be carried out directly in combination with a resin-forming step as hereinbefore discussed, it will be appreciated that the step of precipitating the resin in a finely divided form may be practiced independently of the resin-forming step. Thus, a solution of resin in liquid sulfur dioxide may be passed through line 18 to line 20 and precipitator 21 from any suitable source. Continuous operation in precipitator 21 may be secured by operating reactor 10 in a continuous manner or by operating a series of such reactors and discharging first one reactor and then another into the precipitator. Further, although the process of the invention has been described in connection with a resin formed in an excess of sulfur dioxide, it will be appreciated that resins formed by the reaction of sulfur dioxide with unsaturated organic compounds according to other processes of the prior art may be purified by dissolving the resin in sulfur dioxide or other solvent and then precipitating the dissolved resin according to the process of this invention. It is to be appreciated that the drawing is diagrammatic and that conventional equipment of suitable size may be supplied for any specific installation by one skilled in the art in the light of the present disclosure and discussion. Although our preferred embodiment has been described in connection with sulfur dioxide as the resin solvent, it will be apparent to those skilled in the art that other solvents for the resin, such as dioxane, may be employed to form the resin solution. In such instances, the reaction may be carried out with only the stoichiometric quantity of sulfur dioxide or with sulfur dioxide in only moderate excess and the solvent added to the reactor after reaction is completed. Also, depending upon the effect of the solvent on the reaction, a solvent other than sulfur dioxide may be present initially in sufficient quantity to form the mobile solution.

*Example I*

As an example of the practice of this invention a reactor similar to that shown in the drawing was employed having a capacity of 20 gallons. To this reactor, which was constructed of steel, was charged 115 lbs. of sulfur dioxide having a water content not greater than 50 parts per million to avoid corrosion of the steel autoclave. The sulfur dioxide was present in the reactor as a liquid under its own vapor pressure and was brought to a temperature of about 80° F. prior to the introduction of the olefin mixture. An olefin mixture was prepared of two pounds of 2-butene, one pound of 1-butene and three pounds of propylene as liquids in the small charge cylinder. This olefin mixture was charged at its own vapor pressure and at a temperature of about 80° F. together with a catalyst solution comprising 13 grams of anhydrous lithium nitrate in sufficient absolute ethyl alcohol to make a total of 325 cc. of catalyst solution. The reactor was surrounded by a water jacket containing water at about 86° F., and the pressure on the system was about 50 lbs. per square inch. Immediately upon introduction of the olefin and catalyst the pressure dropped about 5 to 10 pounds and the temperature dropped about 2 to 3 degrees F. Within a few minutes the temperature had risen to a maximum value of about 105° F. and the pressure had risen to about 95 lbs. per square inch guage. The maximum pressure had been reached in about 25 minutes and the maximum temperature in about 35 minutes. During this time cooling water was present in the cooling jacket, but was not circulated. After about 5 hours the temperature was about 80° F., the pressure was about 50 lbs. per square inch guage and about 75% of the olefin had undergone reaction.

At the end of this time the solution of the resin and liquid sulfur dioxide had a viscosity roughly similar to that of SAE 30 lubricating oil. This solution was passed from reactor 10 through line 20 to precipitator 21 which contained 100 gallons (833 pounds) of water. This water had been saturated with sulfur dioxide and heated to 120° F. and was maintained at atmospheric pressure. The agitator 23 was placed in operation and the solution of the resin was discharged below the surface of the water and close to the impeller at the rate of about ½ to 1 gallon per minute. Upon dispersion of the solution into the water copious volumes of vaporous sulfur dioxide were evolved and the resin was precipitated as a soft curd which rapidly broke down into a fluffy, fibrous, finely divided material. The resulting slurry was pumped through line 20 to separating and purifying means 35 which comprised a stainless steel centrifuge. The liquid was removed from the slurry and the resulting precipitate was washed repeatedly to remove sulfur dioxide and/or other impurities after which it was dried in a rotary vacuum drier under a vacuum of 26 inches of mercury and at a temperature of about 175 to 180° F.

The product of this treatment was a powdery material having a density of 15 to 16 lbs. per cubic foot, about 50 per cent of which would pass through a 60 mesh screen and which contained less than 0.5 per cent of volatile material. The resin molded to produce a clear transparent, practically colorless specimen which, except for a slight deepening of color, was not affected by exposure to a temperature of 250° F. over a period of 24 hours.

*Example II*

The reactor was charged at a temperature of approximately 80° F. with 500 cc. lithium nitrate solution (5% by weight LiNO₃ in absolute alcohol) followed by the addition of 2.09 pounds of butene-2, 1.08 pounds of butene-1, 170 pounds of sulfur dioxide, and 3.17 pounds of propylene in the order named. The cooling water temperature was approximately 86° F., and it was not circulated during the reaction. The temperature rose to a maximum of 108° F. and was then allowed to taper off over a total reaction period of 23½ hours. The resulting resin solution, which was similar to that in the preceding example, was discharged into 50 gallons of methanol in the manner described in Example I. The resulting slurry was filtered, washed with fresh methanol, and dried at 160° F. under a 12-15 inch vacuum. A fine, granular resin powder was obtained, a portion of which was molded and a satisfactory specimen obtained.

*Example III*

The reactor was charged at a temperature of approximately 80° F. with 116 pounds of sulfur dioxide followed by the addition of 5½ pounds mixed olefin (in the ratio of 3 pounds of propylene, 2 pounds of butene-2, 1 pound of butene-1) and 325 cc. lithium nitrate solution (5% by weight LiNO₃ in absolute alcohol). The cooling water temperature was approximatey 86° F., and it was not circulated during the reaction. The maximum temperature was 95° F. and the total reaction time was 17 hours. The resulting resin solution was discharged into 50 gallons of methanol in the manner described in Example I. The slurry was filtered, washed with fresh methanol, and dried at 165° F. under a 24 inch vacuum. A fine, granular resin powder was obtained, a portion of which was molded and a satisfactory specimen obtained.

*Example IV*

The reactor was charged with 500 cc. of lithium nitrate solution (5% by weight LiNO₃ in absolute alcohol) and this was followed with the addition of 2.09 pounds of butene-2, 1.08 pounds of butene-1, 170 pounds of sulfur dioxide, and 3.17 pounds of propylene in the order named. The cooling water temperature was approximately 86° F., and it was not circulated during the reaction. The maximum temperature was 110° F. and the reaction time was 24¾ hours. The resin solution was discharged into 80 gallons of benzol in the manner described in Example I. The resulting slurry was filtered, washed with fresh benzol, and dried at 160° F. under a 16-17 inch vacuum. A fine, granular resin powder was obtained, a portion of which was molded and a satisfactory specimen obtained.

*Example V*

The reactor was charged with 115 pounds of sulfur dioxide to which was added 5¾ pounds of mixed olefin (ratio as in Example II) and 325 cc. of lithium nitrate solution (5% by weight LiNO₃ in absolute alcohol). The cooling water temperature was approximately 86° F., and it was not circulated during the reaction. The maximum temperature was 102° F. and the reaction time was 24¼ hours. The resin solution was precipitated in 54 gallons of benzol in the manner described in Example I. The resulting slurry was filtered, washed with benzol, and dried at 200° F. under a 26 inch vacuum. A fine, granular resin powder was obtained, a portion of which was molded and a satisfactory specimen obtained.

*Example VI*

The reactor was charged with 50 cc. of lithium nitrate solution (5% by weight LiNO₃ in absolute alcohol) followed by the addition of 34 grams of butene-1, 66 grams butene-2, 800 grams of sulfur dioxide, and 100 grams of propylene in the order named. The cooling water temperature was approximately 86° F., and it was not circulated during the reaction. The maximum temperature was 97° F. and at the end of 6 hours when the reaction was judged complete 7,750 grams of sulfur dioxide were pumped into the reactor to dissolve the resinous reaction product and agitation was continued for 17 hours additional. The resulting solution was discharged into 6½ gallons of methanol. The slurry obtained was filtered, washed with methanol, and dried at 200° F. A fine, granular resin powder was obtained, a portion of which was molded and a satisfactory specimen obtained.

*Example VII*

The reactor was charged with 50 cc. of lithium nitrate solution (5% by weight LiNO₃ in absolute alcohol) followed by the addition of 34 grams of butene-1, 66 grams of butene-2, 800 grams of sulfur dioxide, and 100 grams of propylene in the order named. The cooling water temperature was approximately 86° F., and it was not circulated during the reaction. The maximum temperature was 99° F. and at the end of 6 hours when the reaction was judged complete 5000 grams of dioxane were added to the autoclave to dissolve the resinous reaction product and agitation was continued for 16 hours additional. The resulting resin solution was precipitated in 5 gallons of methanol. The slurry obtained was filtered, washed in methanol, and dried at 200° F. A fine, granular resin powder was obtained, a portion of which was molded and a satisfactory specimen obtained.

*Example VIII*

The reactor was charged with 50 cc. of the same catalyst as in the previous examples followed by the addition of 49 grams of butene-1, 95 grams of butene-2, 7750 grams of sulfur dioxide, and 144 grams of propylene in the order named. The cooling water temperature was approximately 86° F., and it was not circulated during the reaction. The maximum temperature was 99° F. and reaction time was 21 hours. The resin solution was precipitated in 6 gallons of trichloroethylene in the manner described in Example I. The resulting slurry was filtered, washed in trichloroethylene, and dried at 200° F. A fine, granular resin powder was obtained, a portion of which was molded and a satisfactory specimen obtained.

Example IX

The reactor was charged with 118 pounds of sulfur dioxide to which was added 325 cc. of lithium nitrate solution (5% by weight $LiNO_3$ in absolute alcohol) and 5¾ pounds of olefin premixed as in Example III. The cooling water temperature was approximately 86° F., and it was not circulated during the reaction. The maximum temperature was 101° F. and the reaction time was 9 hours. The resin solution was precipitated in 85 gallons of water in the manner described in Example I. The slurry was filtered, washed with methanol, and dried at 162° F. under a 25 inch vacuum. A fine, granular resin powder was obtained, a portion of which was molded and a satisfactory specimen was obtained.

Example X

The reactor was charged with 32 cc. of lithium nitrate solution (5% by weight $LiNO_3$ in absolute alcohol), 280 grams of butene-1, and 5220 grams of sulfur dioxide. The maximum temperature was 95° F. and the reaction time was 7 hours. The resin solution was precipitated in 5 gallons of water, filtered, washed with water, and dried at 140° F. A fine, granular resin powder was obtained, a portion of which was molded and a satisfactory specimen was obtained.

Example XI

The reactor was charged with 32 cc. of lithium nitrate solution (5% by weight $LiNO_3$ in absolute alcohol), 280 grams of butene-2, and 5220 grams of sulfur dioxide. The maximum reaction temperature was 86° F. and the reaction time was 23 hours. The resin solution was precipitated in 5 gallons of water, filtered, washed with water and dried at 155° F. A fine, granular resin powder was obtained, a portion of which was molded and a satisfactory specimen was obtained.

Example XII

The reactor was charged with 32 cc. of lithium nitrate solution (5% by weight $LiNO_3$ in absolute alcohol) with 93 grams of butene-1, 187 grams of butene-2, and 5220 grams of sulfur dioxide. The maximum reaction temperature was 95° F. and the reaction time was 6 hours. The resin solution was precipitated in 5 gallons of water, filtered, washed with water, and dried at 130° F. A fine, granular resin powder was obtained, a portion of which was molded and a satisfactory specimen was obtained.

Example XIII

The reactor was charged with 35 cc. of lithium nitrate solution (5% by weight $LiNO_3$ in absolute alcohol), 280 grams of pentene-1, and 5220 grams of sulfur dioxide. The maximum temperature was 90° F. and the reaction time was 6 hours. The resin solution was precipitated in water, filtered and washed with water, and dried at 125° F. A fine, granular resin powder was obtained, a portion of which was molded and a satisfactory specimen obtained.

Example XIV

The reactor was charged with 35 cc. of lithium nitrate solution (5% by weight $LiNO_3$ in absolute alcohol), 196 grams of pentene-1, 5220 grams of sulfur dioxide, and 112 grams of propylene in the order named. The maximum reaction temperature was 86° F. and the reaction time was 6½ hours. The resin solution was precipitated in water, filtered, washed in water, and dried at 150° F. A fine, granular resin powder was obtained, a portion of which was molded and a satisfactory specimen was obtained.

Example XV

The reactor was charged with 20 cc. of lithium nitrate solution (5% by weight $LiNO_3$ in absolute alcohol), 122 grams of butene-2, 3050 grams of sulfur dioxide and 55 grams of propylene in the order named. The maximum reaction temperature was 95° F. and the reaction time was 5½ hours. The resin solution was precipitated in 5 gallons of water, filtered and washed with methanol, and dried at 180° F. A fine, granular resin powder was obtained, a portion of which was molded and a satisfactory specimen was obtained.

It is understood that this invention is applicable to any sulfur dioxide-unsaturated organic compound resin which is soluble in sulfur dioxide or the particular solvent employed.

It is to be appreciated that the preceding description of the drawing and the examples is to illustrate the invention and should not be used unduly to place unnecessary limitations upon the invention. Various modifications of the invention may be practiced in the light of the present disclosure and teachings without departing from the spirit or scope of the invention.

What is claimed is:

1. The process of making a sulfur dioxide-olefin resin in the form of a finely divided powder suitable for molding, without mechanical grinding, which comprises reacting a mixture of 50 weight per cent of propylene, 33 weight per cent of butene-2 and 17 weight per cent of butene-1 with liquid anhydrous sulfur dioxide, sulfur dioxide being present in an amount ranging from 15 to 20 times by weight the amount of said olefins at a temperature of from 80° F. to 105° F. and under pressure until 75 per cent of said olefins have reacted with sulfur dioxide to form a heteropolymeric resin dissolved in the excess of liquid sulfur dioxide, the solution being a free-flowing liquid having a viscosity similar to that of SAE 30 lubricating oil, withdrawing said solution from the reaction zone, rapidly and intimately and with vigorous agitation mixing a stream of said solution with a mechanically vigorously agitated body of water maintained at a temperature of from 90 to 120° F. and of a volume sufficiently large that the resin is precipitated in finely divided solid form to form a pumpable mobile slurry, effecting said mixing at substantially atmospheric pressure such that a major portion of the sulfur dioxide is vaporized and immediately removed from the resulting slurry of water and precipitated resin, settling said slurry and thereby separating same into the bulk of the water and relatively concentrated slurry, and subjecting said concentrated slurry to drying to produce a dry finely divided powdered resin as the final product of the process.

2. In a process of making a sulfur dioxide-unsaturated organic compound resin from sulfur dioxide and an unsaturated organic compound which reacts therewith to form a heteropolymer soluble in liquid sulfur dioxide, the improvement of obtaining such a resin in the form of a finely divided powder suitable for molding, without mechanical grinding, which comprises reacting liquid anhydrous sulfur dioxide with such an unsaturated organic compound, sulfur dioxide being present during said reacting step in an amount equal to at least 15 times by weight the amount of said unsaturated organic compound, thereby forming a solution of said resin in the excess of liquid sulfur dioxide, said solution being a free-flowing liquid sufficiently mobile to permit ready removal from the reaction zone as a liquid, withdrawing said solution from the reaction zone, rapidly and intimately mixing a stream of said solution with a relatively large and mechanically vigorously agitated body of water, said body of water being at a temperature between 35 and 180° F. and being sufficiently large in volume that the resin is precipitated in finely divided solid form to form a pumpable, mobile slurry in the water, effecting said mixing at a low pressure such that a major portion of the sulfur dioxide is vaporized and removed from the resulting slurry of water and precipitated resin, and recovering the resin as a dry finely divided powder from said resulting slurry.

3. The process of claim 2 in which said resin is produced by reacting sulfur dioxide with an olefin having at least four carbon atoms per molecule and the amount of sulfur dioxide present during said reacting step is between 15 and 20 times by weight the amount of said olefin.

4. In a process for producing a solid resin by reacting sulfur dioxide with an olefin having at least four carbon atoms per molecule to produce a solid, heteropolymeric resinous product, the improvement which comprises conducting said reaction in the presence of an excess of liquid sulfur dioxide over that entering into the reaction such that there is at least 15 times by weight as much liquid sulfur dioxide as olefin charged to the reaction zone, whereby the resulting resin is formed in and remains dissolved in liquid sulfur dioxide and the resulting solution is sufficiently mobile for ready removal from the reaction zone as a liquid, introducing a stream of the resulting solution into a mechanically vigorously agitated body of an inert liquid in which the resin is insoluble, maintained between 35 and 180° F. and at a low pressure, withdrawing the bulk of the free sulfur dioxide, present in said stream, as a vapor from said body of inert liquid, freeing said withdrawn sulfur dioxide from said inert liquid and returning same to said reaction zone as a part of the aforesaid continuously introduced liquid sulfur dioxide, withdrawing from said body of liquid a liquid slurry comprising a resulting finely divided suspension of resulting heteropolymeric resin in said liquid, separating said suspended matter from said inert liquid as a product of the process, and returning said inert liquid to said agitated body of liquid.

5. The process of claim 4 wherein water is used as said inert liquid and wherein the amount of sulfur dioxide charged to said reaction zone is between 15 and 20 times by weight the amount of said olefin charged.

ALLISON K. SCRIBNER.
FRANK W. WILDER.

REFERENCES CITED

The following references are of record in the file of this patent:

UNITED STATES PATENTS

| Number | Name | Date |
|---|---|---|
| 1,890,772 | Dykstra | Dec. 13, 1932 |
| 2,112,986 | Frey | Apr. 5, 1938 |
| 2,184,295 | Frey | Dec. 26, 1939 |
| 2,280,818 | Frey | Apr. 28, 1942 |
| 2,292,737 | Blomer | Aug. 11, 1942 |
| 2,314,067 | Barnett | Mar. 16, 1943 |
| 2,356,896 | Smith | Aug. 29, 1944 |

FOREIGN PATENTS

| Number | Country | Date |
|---|---|---|
| 670,212 | Germany | Aug. 31, 1934 |
| 528,051 | Great Britain | Oct. 22, 1940 |

OTHER REFERENCES

Ryden et al., J. Am. Chem. Soc., vol. 59, pp. 1014–1015, 1937.

Ryden and Marvel, J. Am. Chem. Soc., vol. 57, pp. 2311–2314, 1935.